United States Patent [19]

Cockerell, Jr.

[11] Patent Number: 4,698,781

[45] Date of Patent: Oct. 6, 1987

[54] SYSTEMS FOR DETERMINING DISTANCES TO AND LOCATIONS OF FEATURES ON A GOLF COURSE

[75] Inventor: William C. Cockerell, Jr., Ramona, Calif.

[73] Assignee: Spymark, Incorporated, Vista, Calif.

[21] Appl. No.: 849,703

[22] Filed: Apr. 9, 1986

Related U.S. Application Data

[63] Continuation of Ser. No. 519,069, Aug. 1, 1983, abandoned.

[51] Int. Cl.⁴ .................. G01C 21/00; G06G 7/78; G01S 3/02
[52] U.S. Cl. .................. 364/561; 364/449; 364/460; 342/451; 342/463
[58] Field of Search .......... 364/448, 449, 451, 452, 364/460, 561; 342/450, 451, 458, 463

[56] References Cited

U.S. PATENT DOCUMENTS

| | | | |
|---|---|---|---|
| 2,569,328 | 9/1951 | Omberg | 346/33 |
| 2,921,306 | 1/1960 | Jaffe | 343/112 |
| 3,181,146 | 4/1965 | Huckabay et al. | 343/458 |
| 3,184,739 | 5/1965 | Franklin et al. | 343/15 |
| 3,757,340 | 9/1973 | Rogoff | 343/463 |
| 3,789,410 | 1/1974 | Smith et al. | 343/458 |
| 3,848,254 | 11/1974 | Drebinger et al. | 364/452 |
| 3,868,692 | 2/1975 | Woodard et al. | 343/112 D |
| 3,916,410 | 10/1975 | Elwood | 343/458 |
| 3,953,856 | 4/1976 | Hammack | 343/458 |
| 3,975,731 | 8/1976 | Latham et al. | 364/451 X |
| 4,107,689 | 8/1978 | Jellinek | 364/450 X |
| 4,136,394 | 1/1979 | Jones et al. | 364/561 |
| 4,359,733 | 11/1982 | O'Neill | 364/449 X |
| 4,433,335 | 2/1984 | Wind | 343/463 |
| 4,480,310 | 10/1984 | Alvarez | 364/460 |

Primary Examiner—Gary Chin
Assistant Examiner—Joseph L. Dixon
Attorney, Agent, or Firm—Brown, Martin, Haller & Meador

[57] ABSTRACT

A golfer wishing to know the distance to a specified feature on a golf course, such as the pin on the next green, operates a portable interrogation unit, which transmits an interrogation signal including a request for the distance to the location of the specified feature. Three remote stations located to define a triangle encompassing a substantial portion of the course receive the interrogation signal and communicate interrogation information signals to a central station. The interrogation information signals include the interrogation signal data, remote station identification data, and pertaining to the location of the source of the interrogation signal relative to the remote station. The central station includes a memory which stores the locations of various predetermined features on the course and a CPU which processes the interrogation information signals from the remote stations to determine the location of the portable interrogation unit and further processes the determined unit locations with the location of the specified feature to determine the distance from the portable unit to the specified feature. The central station transmits a response signal to the portable unit indicating the determined distance, which the portable unit then displays. To survey the locations of the various predetermined features on the course, a portable survey unit is substituted for the portable interrogation unit and transmits a survey signal including feature identification data. The CPU determines the location of the portable survey unit and causes such location to be stored in an area of the memory addressed by the feature identification data in the survey signal.

7 Claims, 8 Drawing Figures

SYSTEMS FOR DETERMINING DISTANCES TO AND LOCATIONS OF FEATURES ON A GOLF COURSE

This is a continuation of application Ser. No. 519,069 filed Aug. 1, 1983, now abandoned.

BACKGROUND OF THE INVENTION

The present invention generally pertains to electronic communications and is particularly directed to improved systems for determining distances to and locations of predetermined features on a golf course.

Golfers are particularly interested in determining the distance to the pin from their location on the course. In a system described in U.S. Pat. No. 3,868,692 to Woodward et al, separate transmitters are located at each hole on the golf course and transmit RF signals at separate frequencies associated with the respective holes. The golfer carries a portable unit which is tunable to any of the associated frequencies to identify the hole of interest; determines distance to the green based upon the strength of the received signal at the tuned frequency; and displays the determined distance to the golfer.

In another system described in U.S. Pat. No. 4,136,394 to Jones et al, a transponder is mounted at or near the pin on each green on the course and the golfer carries a portable unit which transmits an RF signal to the transponder. The transponder responds to receipt of the RF signal by transmitting an acoustic or sonic signal. The portable unit receives the acoustic or sonic signal; determines distance to the pin based upon the elapsed time between transmission of the RF signal and receipt of the acoustic or sonic signal and displays the determined distance to the golfer.

SUMMARY OF THE INVENTION

The system of the present invention does not require the positioning of a transmitter or a transponder at each pin or at any other feature on the golf course to which the golfer may wish to determine distance, such as a dog leg or a water hazard. Further, the system of the present invention enables ready determination of the distance to any one of various predetermined features of the golf course and also enables a golfer to determine the distance of a drive or fairway shot.

The system of the present invention for determining distances on a golf course includes a portable interrogation unit, which is carried by the golfer; at least three remote stations located at known locations about the golf course to define a triangle encompassing a substantial portion of the golf course; and a central station.

The portable interrogation unit encodes and transmits an interrogation signal from any position on the golf course. The interrogation signal includes unit identification data and a request pertaining to the distance between the location of the portable interrogation unit and a specified location selected from various predetermined locations on the golf course.

At least one of the remote stations includes a receiver for receiving the interrogation signal from the portable interrogation unit; and an encoder responsive to receipt of the interrogation signal for encoding and communicating an interrogation information signal to the central station, wherein the interrogation information signal includes remote station identification data, data pertaining to the location of the source of the interrogation signal relative to the remote station, the unit identification data and the request included in the received signal. The data pertaining to the locations of the source of the interrogation signal preferably indicates either the time of arrival of the interrogation signal or the bearing of the source of the interrogation signal relative to the remote station.

Each of the other remote stations includes a receiver for receiving the interrogation signal from the portable interrogation unit and an encoder responsive to receipt of the interrogation signal for encoding and communicating an interrogation information signal to the central station, wherein the interrogation information signal includes remote station identification data and information pertaining to the location of the source of the interrogation signal relative to the remote station.

The central station receives the interrogation information signals from the remote stations. The central station includes a processor for processing the received interrogation information signals to determine the distance between the portable interrogation unit and the specified location on the golf course indicated by the request, and responds to the distance determination and to the received interrogation information signals by encoding and transmitting a response signal addressed to the portable iterrogation unit indicated by the unit identification data in the received information signals. The response signal indicates the requested distance.

The portable interrogation unit further includes a receiver for receiving the response signal addressed to the portable interrogation unit and a decoder which is responsive to the response signal for displaying an indication of the requested distance.

In another aspect, the present invention combines the remote stations and the central station with a portable survey unit to provide a system for surveying locations of predetermined features of a golf course. The portable survey unit encodes and transmits a survey signal from any feature on the golf course. The survey signal includes identification of a specified predetermined feature selected from various predetermined features on the golf course, such as the pin locations, the tee locations, locations of dog legs, and both the near side and far side of water hazards.

The remote stations receive the survey signal and respond thereby by encoding and communicating survey information signals to the central station. The survey information signals include remote station identification data for each remote station, data pertaining to the location of the source of the survey signal relative to each remote station, and the feature identification data included in the received survey signal.

The central station receives the survey information signals from the remote stations. The central station processor processes the received survey information signals to determine the location on the golf course of the feature indicated by the feature identification data in the survey signal.

The golf-course-feature locations determined by the processor are stored in a memory of the processor in storage areas addressed by the feature identification data portion of the received survey informations signals. The golf-course-feature locations are retrieved from the memory for making distance determinations pertaining to such locations.

The survey system of the present invention enables the feature locations stored in the memory to be readily changed when pin and tee locations are changed on the golf course.

Additional features of the present invention are described in relation to the description of the preferred embodiment.

DESCRIPTION OF THE PREFERRED EMBODIMENTS

Figure 1:
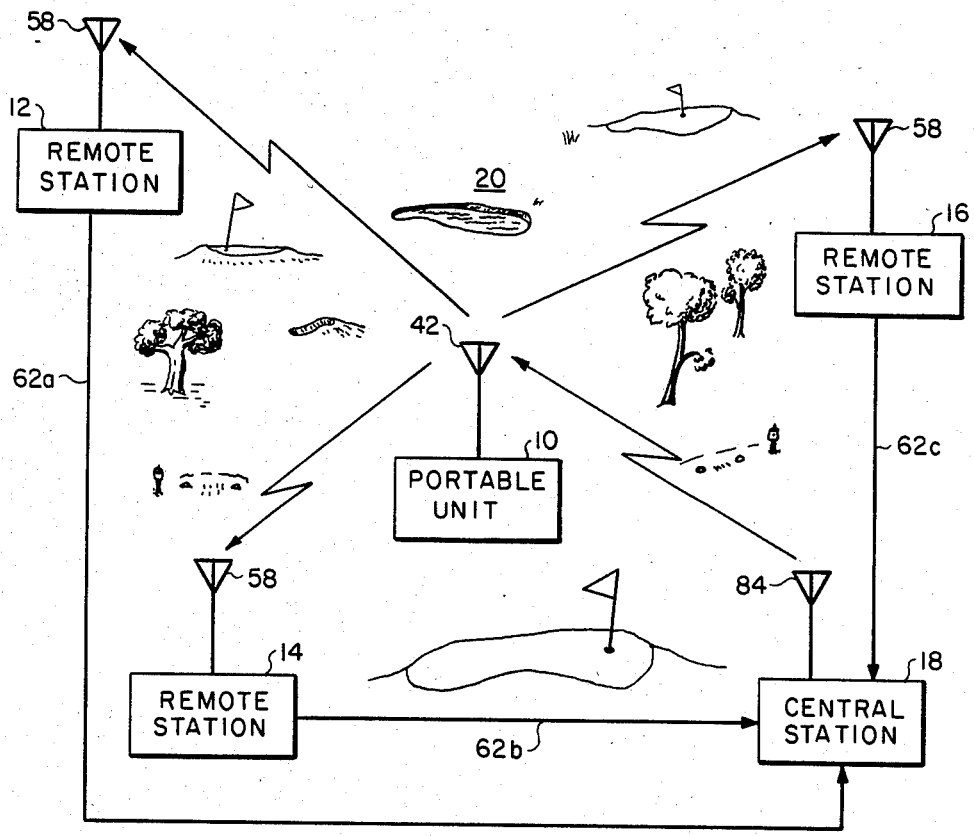
FIG. 1 is a block diagram of the distance determining and location surveying systems of the present invention.

Referring to FIG. 1, a preferred embodiment of the system of the present invention includes a portable unit 10, three remote stations 12, 14 and 16 and a central station 18.

The three remote stations 12, 14, 16 are located at known locations about a golf course 20 to define a triangle encompassing a substantial portion of the golf course 20.

Figure 2:
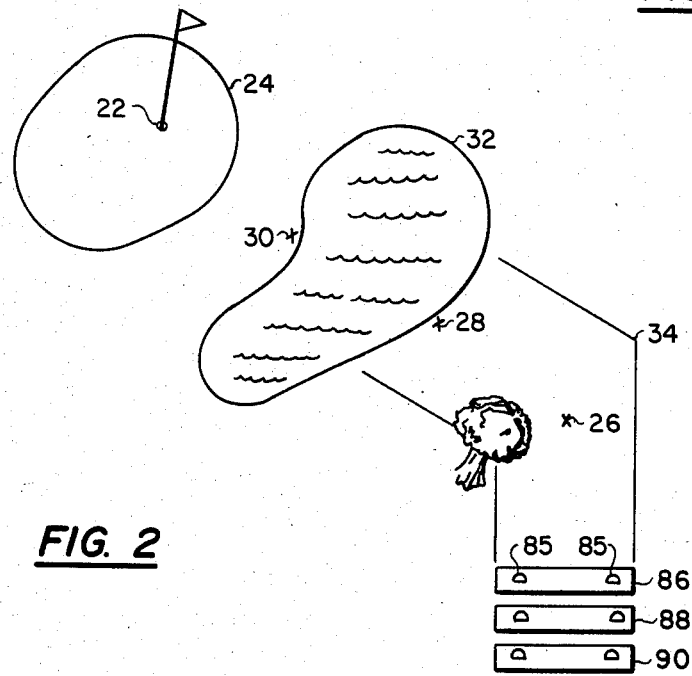
FIG. 2 illustrates the location of various predetermined features on a golf course.

The system for determining distances on the golf course determines the distance between the location of the portable unit 10 and a specified location selected from various predetermined locations on the golf course 20. Referring to FIG. 2, the predetermined locations on the golf course 20 include the locations of various predetermined features on the golf course, such as the location of a pin 22 on a green 24, the location of a dog leg 26, and the locations of both the near side 28 and the far side 30 of a water hazard 32 as one approaches the green 24. The locations chosen to define the dog leg 26 and the near and far sides 28, 30 of the water hazard 32 are along the centerline of the fairway 34.

Figure 3:
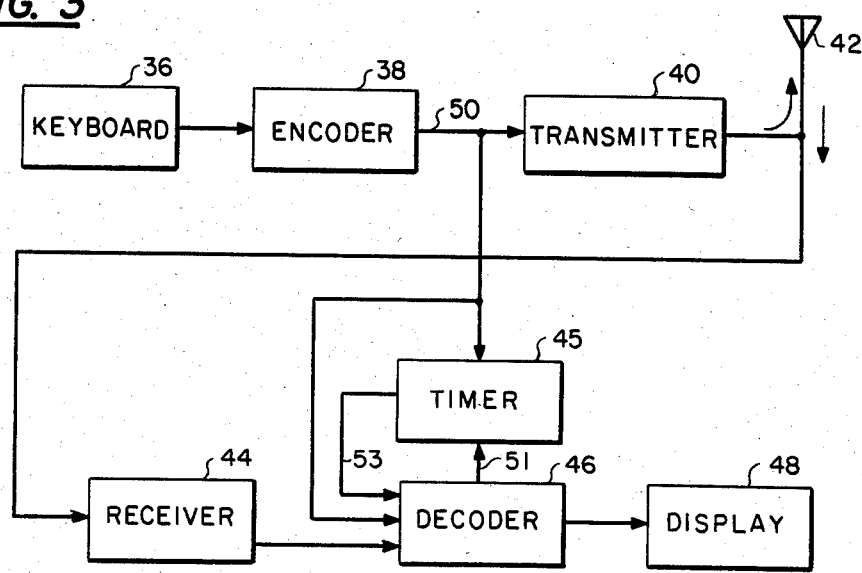
FIG. 3 is a block diagram of a preferred embodiment of a portable unit for use in the system of FIG. 1.
Figure 4:
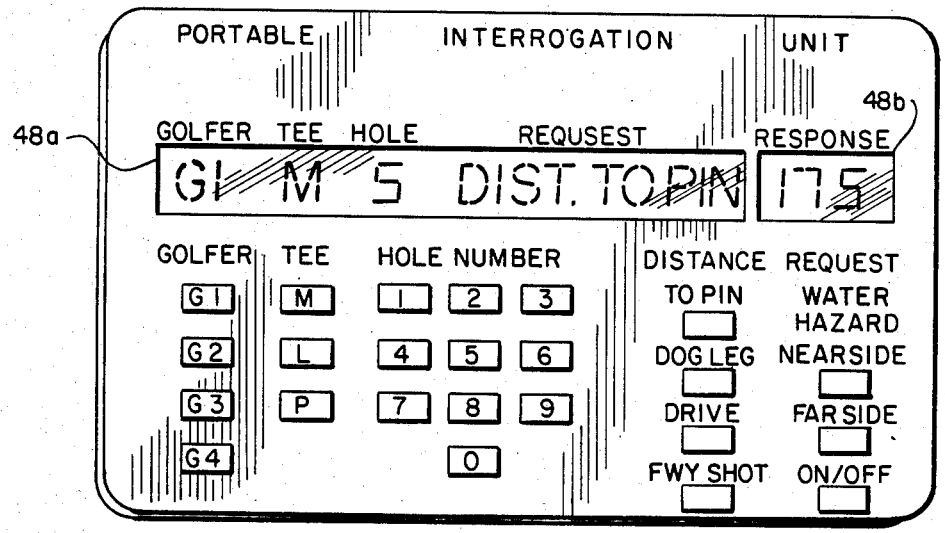
FIG. 4 illustrates a preferred embodiment of a keyboard and display of a portable interrogation unit for use in the system of FIG. 1.

Referring to FIG. 3, the preferred embodiment of the portable unit 10 includes a keyboard 36, an encoder 38, a transmitter 40, an antenna 42, a receiver 44, a timer circuit 45, a decoder 46, and a display 48. The preferred embodiment of the keyboard and display of the portable interrogation unit are illustrated in FIG. 4.

The keyboard includes keys and associated indicia indicating golfer number (G1, G2, G3 and G4); the tee that is used by the golfer, i.e. men's (M), ladies (L) or professional (P); the hole number (1, 2, 3, 4, 5, 6, 7, 8, 9 and 0); and various distance requests, i.e. distance to the pin (TO PIN), distance to dog leg (DOG LEG), distance of drive (DRIVE), distance of fairway shot (FWY SHOT), distance to the near side of a water hazard (WATER HAZARD NEAR SIDE) and distance to the far side of the water hazard (WATER HAZARD FAR SIDE). An ON/OFF key also is included. The display of the portable interrogation unit of FIG. 4 includes a first portion 48a for displaying a request for information and a second portion 48b for displaying the response to such request.

The encoder 38 responds to operation of the keyboard 36 by encoding interrogation signals that are provided on lines 50 to the transmitter 40 and the decoder 46. The transmitter 40 is coupled to the antenna 42 for transmitting the interrogation signals to the remote stations 12, 14 and 16 from any position on the golf course 20. The interrogation signals are transmitted as digital signals on an RF carrier.

Each interrogation signal includes portable unit identification data, golfer identification data and a request pertaining to the distance between the location of the portable interrogation unit 10 and a specified location selected from various predetermined locations on the golf course 20.

The decoder 46 decodes the interrogation signal on line 50 to cause the request to be displayed in the first portion 48a of the display, as illustrated in FIG. 4. In the illustrated example, golfer G1, who is playing from the mens' tees, has requested the distance to the pin on the 5th hole. Data pertaining to the tee from which the golfer is playing is included in the interrogation signal only when entered by operation of the keyboard 36, and is required when the golfer requests the distance of his drive.

Figure 5:
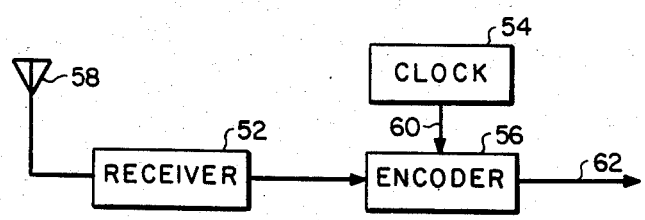
FIG. 5 is a block diagram of one preferred embodiment of a remote station in the system of FIG. 1.

Alternative preferred embodiments of the remote stations 12, 14, 16 are described with reference to FIGS. 5 and 6. In the embodiment of FIG. 5, the remote stations each include a receiver 52, a clock 54, an encoder 56 and an antenna 58.

Interrogation signals from portable interrogation units on the golf course are received by the remote station antenna 58 and provided to the receiver 52 and thence to the encoder 56. The clock 54 provides a timing signal on line 60 to the encoder 56. The encoder 56 responds to receipt of the interrogation signal by encoding and communicating an interrogation information signal on line 62 to the central station 18.

The interrogation information signal on line 62 from each remote station includes remote station identification data and the time of arrival of the interrogation signal at the remote station, as determined from the timing signal on line 60. The interrogation information signal provided on line 62 from at least one of the remote station encoders 56 also includes the portable unit identification data, golfer and tee identification data and the distance request included in the received interrogation signal.

Figure 6:
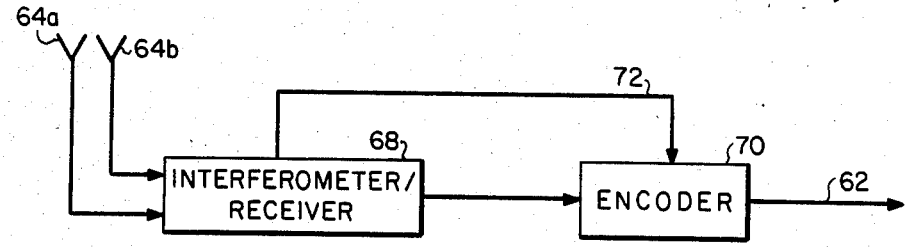
FIG. 6 is a block diagram of an alternative preferred embodiment of a remote station in the system of FIG. 1.

In the embodiment of FIG. 6, the remote stations each include at least two antennas 64a, 64b, an interferometer/receiver 68 and an encoder 70.

Interrogation signals from portable interrogation units on the golf course are provided by the two remote station antennas 64a, 64b to the interferometer/receiver 68 and the encoder 70. The interferometer provides a bearing signal on line 72 to the encoder 70 indicating the bearing of the source of the received interrogation signal relative to the remote station. The encoder 70 responds to the receipt of the interrogation signal by encoding and communicating an interrogation information signal on line 62 to the central station 18.

The interrogation information signal on line 62 from each remote station includes remote station identification data, and information indicating the bearing of the source of the interrogation signal relative to the remote station as determined from the bearing signal on line 72. The interrogation information signal provided on line 62 from at least one of the remote station encoders 56 also includes the portable unit identification data, golfer and tee identification data and the distance request included in the received interrogation signal.

The interrogation information signals are communicated from the three remote stations 12, 14 and 16 via lines 62a, 62b and 62c, respectively, to the central station 18 (FIG. 1).

Figure 7:
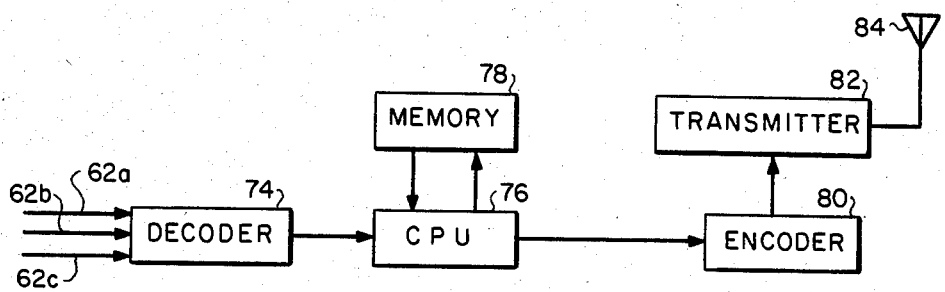
FIG. 7 is a block diagram of a preferred embodiment of the central station in the system of FIG. 1.

Referring to FIG. 7, the central station includes a decoder 74, a processor including a central processing unit (CPU) 76 and a memory 78, an encoder 80, a transmitter 82 and an antenna 84.

The interrogation information signals received on lines 62a, 62b and 62c from the respective remote stations 12, 14 and 16 are decoded by the decoder 74 and processed by the CPU 76 to determine the distance between the portable interrogation unit 10 and the specified location on the golf course indicated by the request included in the received interrogation information signal.

The memory 78 stores data indicating the location of each of the various predetermined locations on the golf course. The stored data indicates the coordinates of the various features on the golf course, such as the locations of the pins, tees, dog legs and water hazards. The storage of the golf-course-feature-indication data in the memory 78 is described below with reference to the discussion of the preferred embodiment of the golf course survey system of the present invention. The memory 78 also stores data indicating the location of each of the remote stations 12, 14, 16.

The CPU 76 processes the source-location information in the interrogation information signals received on lines 62a, 62b and 62c in relation to remote-station-location data retrieved from the memory 78 to provide an indication of the coordinates of the location of the portable interrogation unit 10 on the golf course. When the system includes the remote station embodiment of FIG. 5, the CPU 76 processes the information in the interrogation information signals on lines 62a, 62b and 62c indicating the relative times of arrival of the interrogation signal at the three remote stations 12, 14, 16 together with the associated remote station identification data in such signals and the remote-station-location data retrieved from the memory 78 to determine the coordinates of the location of the portable interrogation unit 10 on the golf course. Such determination is made in accordance with typical prior art range determination processing techniques.

When the system includes the remote station embodiment of FIG. 6, the CPU processes the information in the interrogation information signals on lines 62a, 62b and 62c indicating the bearing of the portable interrogation unit 10 relative to the locations of the three remote stations together with the associated remote station identification data in such signals and the remote-station-location data retrieved from the memory 78 to determine the coordinates of the location of the portable interrogation unit 10 on the golf course. Such determination is made in accordance with typical prior art range determination processing techniques.

Alternatively, the memory 78 contains look-up tables from which the coordinates of different locations on the golf course can be retrieved by the CPU 76 upon the memory 78 being addressed by the source-location information associated with the respective remote station identification data in the interrogation information signals received on lines 62a, 62b and 62c. The source-location information is either the relative-time-of-arrival information or the bearing information described with reference to the remote station embodiments of FIGS. 5 and 6, respectively. The degree of resolution of the different locations is dependent upon the amount of memory capacity that is dedicated to the look-up tables.

The CPU 76 accesses the memory 78 in response to the specified location included in the request portion of the received interrogation information signals on lines 62a, 62b and 62c to retrieve an indication of the coordinates of the specified location on the golf course. The CPU 76 then processes the indication of the coordinates of the location of the portable interrogation unit and the indication of the coordinates of the specified location to determine the distance between the portable interrogation unit 10 and the location on the golf course specified in the distance request portion of the interrogation signal.

The portable interrogation unit identification data in the interrogation information signals received on lines 62a, 62b and 62c and decoded by the decoder 74 is transferred by the CPU 76 to the encoder 80.

The encoder 80 responds to the distance determination and by the CPU 76 and to the received interrogation information signals from lines 62a, 62b and 62c by encoding a response signal addressed to the portable interrogation unit indicated by the unit identification data in the received interrogation information signals. The response signal indicates the requested distance. The encoder 76 provides the response signal to the transmitter 82, which is coupled to the antenna 84 for transmitting the response signal. The response signal is transmitted as a digital signal on an RF carrier.

The transmitted response signal is received and provided by the antenna 42 to the receiver 44 and thence to the decoder 46 in each portable interrogation unit (FIG. 3). If the portable interrogation unit is the unit to which the response signal is addressed, the decoder 46 decodes the response signal and causes the determined distance to be displayed on the "response" portion 48b of the display, as illustrated in FIG. 4, where the exemplary distance is shown as 175 yards.

If multiple interrogation signals were transmitted relatively simultaneously from separate portable interrogation units 10, the system would not provide a response addressed to all of such interrogation units. If a response signal addressed thereto is not received by the portable interrogation unit 10 within a predetermined time after the interrogation signal is encoded by the encoder 38, the words TRY AGAIN are displayed in the request portion 48a of the display. Such a display is facilitated by operation of the timer circuit 45.

The timer circuit 45 begins counting time in response to receipt of the encoded interrogation signal on line 50. The timer circuit 45 is reset by a reset signal that is provided on line 51 by the decoder 46 when the decoder 46 receives a response signal from the central station 18 addressed to the interrogation unit. If the timer 45 does not receive a reset signal on line 51 from the decoder 46 before the predetermined time for receipt of the response signal has elapsed, the timer resets itself automatically and provides an error signal on line 53 to the decoder 46. The decoder 46 responds to the error signal on line 46 by causing the words TRY AGAIN to be displayed in the request portion 48a of the display.

One of the distance requests pertains to the distance of a fairway shot. To determine the distance of a fairway shot in reponse to an interrogation signal transmitted from a portable interrogation unit 10 located at the resultant lay of the ball on the course, the CPU 76 must process the indication of the coordinates of the location of the portable unit 10 in relation to the indication of the coordinates of the location from which the fairway shot was taken. Accordingly, the interrogation signal transmitted from the portable interrogation unit 10 necessarily includes golfer identification data; the interrogation information signal communicated to the central station 18 from at least one of the remote stations 12, 14, 16 necessarily includes data identifying a given golfer in accordance with the golfer identification data in the received interrogation signal; and the memory 78 stores an indication of the coordinates of the last previous location from which an interrogation signal was transmitted from the portable interrogation unit of the given golfer. The last portable-interrogation-unit-location coordinate indication associated with a given golfer is retrieved from the memory 78 by the CPU 76 when the request and golfer identification data portion of the next received information signals including data identifying the given golfer indicates a fairway shot, and thereby indicates the last previous location of the given golfer as the specified location to which the distance from the portable interrogation unit 10 is to be determined.

The preferred embodiment of the system of the present invention for surveying locations of predetermined features on a golf course utilizes many of the components of the distance determination system described above. In the surveying system, a portable survey unit is substituted for the portable interrogation unit.

Referring to FIG. 1, the portable survey unit 10 encodes and transmits a survey signal from any feature on the golf course. The survey signal includes identification of a specified predetermined feature selected from various predetermined features on the golf course, such as the locations of the pins 22 on each green 24, the location of each dog leg 26, the locations of both the near side 28 and the far side 30 of a water hazard 32, and the locations of the drive markers 85 on the respective ladies', mens' and professional tees 86, 88 and 90. The locations chosen to define the dog leg 26, the near and far sides 28 and 30 of the water hazards 32, and the drive markers 85 are along the centerline of the fairway 34.

Figure 8:
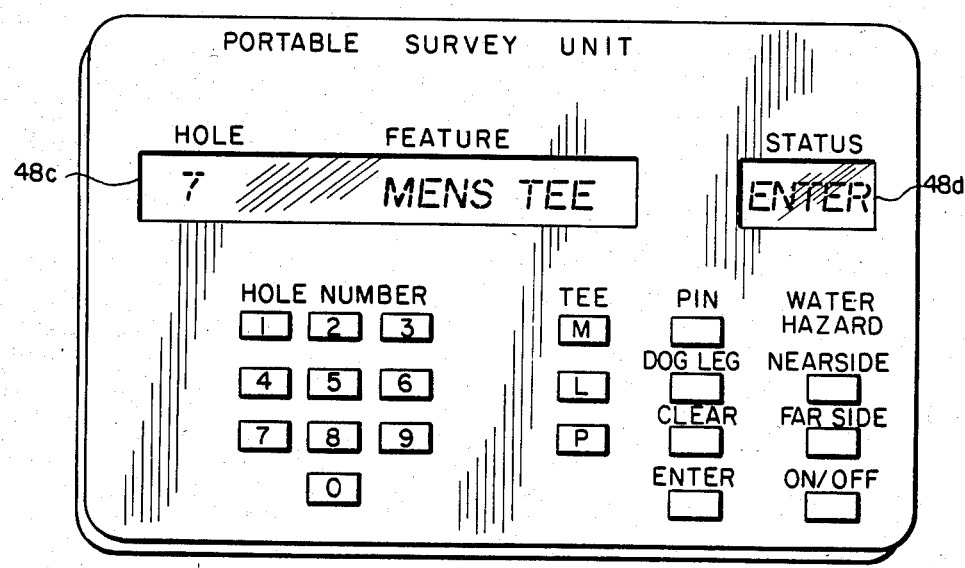
FIG. 8 illustrates a preferred embodiment of a keyboard and display of a portable survey unit for use in the system of FIG. 1.

The preferred embodiment of the keyboard and display of the portable survey unit are illustrated in FIG. 8.

The keyboard includes keys and associated indicia indicating the hole number (1, 2, 3, 4, 5, 6, 7, 8, 9 and 0); tee locations used by men (M), ladies (L) and professionals (P); and various features on the golf course, i.e. pin locations (PIN), dog leg location (DOG LEG), and water hazard locations (WATER HAZARD NEAR SIDE) and (WATER HAZARD FAR SIDE). An ON/OFF key and CLEAR and ENTER function keys also are included. The display includes a first portion 48c for displaying an indication of the course feature to be surveyed and a second portion 48d for displaying function status instructions.

FIG. 3 also is applicable to the portable survey unit.

The encoder 38 responds to operation of the keyboard 36 by encoding survey signals that are provided on lines 50 to the transmitter 40 and the decoder 46. The transmitter 40 is coupled to the antenna 42 for transmitting the survey signals to the remote stations 12, 14 and 16 from any position on the golf course 20. The survey signals are transmitted as digital signals on an RF carrier.

Each survey signal includes identification of a specified predetermined feature selected from various predetermined features on the golf course.

The decoder 46 decodes the survey signal on line 50 to cause the specified feature to be displayed in the first portion 48c of the display, as illustrated in FIG. 8. In the illustrated example, the specified feature is the mens' tee for the 7th hole. The person surveying the course would stand halfway between the drive markers 85 on the mens' tee 88 of the 7th hole when transmitting the survey signal illustrated in this example.

After the keyboard has been operated to provide the specified feature data, as displayed in the feature portion 48c of the display, the person using the portable survey unit then depresses the ENTER key, which causes the survey signal to be transmitted.

The remote stations 12, 14, 16 receive the survey signal and respond thereby by encoding and communicating survey information signals to the central station 18 in the same manner as the interrogation information signals are encoded and communicated, as described above. The survey information signals include remote station identification data for each remote station data pertaining to the location of the source of the survey signal relative to each remote station, and the feature identification data included in the received survey signal.

The central station 18 receives the survey information signals from the remove stations 12, 14, 16. The central station CPU 76 processes the survey information signals received on lines 62a, 62b and 62c to determine the coordinates of the location on the golf course of the feature indicated by the feature identification data in the survey signal in the same manner as the interrogation information signals are processed to determine the location of the portable interrogation unit on the golf course, as described above.

The golf-course-feature-location coordinates determined by the CPU 76 are stored in the memory 78 in storage areas addressed by the feature identification data portion of the received survey informations signals. The golf-course-feature-location coordinates subsequently are retrieved from the memory 78 for making distance determinations pertaining to such feature locations in response to requests pertaining thereto in interrogation information signals.

Upon the coordinates of the location of the specified feature being stored in the memory 78, the CPU 76 causes the encoder 80 to provide a clear signal to the transmitter 82. The clear signal is addressed to the portable survey unit and is transmitted from the antenna 84.

The antenna 42 of the portable survey unit receives the clear signal and provides it to the receiver 44 and decoder 46, which causes a CLEAR indication to be displayed in the status portion 48d of the portable survey unit display.

The display of the word CLEAR indicates to the operator of the portable survey unit that the location of the specified feature identified in the transmitted survey signal has been stored in the memory 78 of the central station 18. The operator then depresses the CLEAR key to clear the feature portion 48c of the display and to enable entry, encoding and transmission of another survey signal from another location on the golf course. Upon the CLEAR key being depressed, the word ENTER appears in the status portion 48d of the display. The operator then can proceed to operate keys to enter the next course feature to be surveyed in the feature portion 48c of the display; and he depresses the ENTER key to transmit the next survey signal when the portable survey unit is located at the displayed course feature. If a clear signal is not received by the portable survey unit 10 within a predetermined time after the survey signal is encoded by the encoder 38, the words TRY AGAIN are displayed in the request portion 48c of the display. Such a display is facilitated by operation of the timer circuit 45.

The timer circuit 45 begins counting time in response to receipt of the encoded survey signal on line 50. The timer circuit 45 is reset by a reset signal that is provided on line 51 by the decoder 46 when the decoder 46 receives a clear signal from the central station 18. If the timer 45 does not receive a reset signal on line 51 from the decoder 46 before the predetermined time for receipt of the clear signal has elapsed, the timer resets itself automatically and provides an error signal on line 53 to the decoder 46. The decoder 46 responds to the error signal on line 46 by causing the words TRY AGIN to be displayed in the request portion 48c of the display.

What is claimed is:

1. A system for determining distances on a golf course, comprising
    a portable interrogation unit for being carried on a golf course to encode and transmit an interrogation signal from any position occupied by a golf ball on the golf course, wherein the interrogation signal includes portable unit identification data and a request pertaining to the distance between the location of the portable interrogation unit and a specified location selected from various predetermined locations on the golf course;
    at least three remote stations located at known locations about the golf course to define a triangle encompassing a substantial portion of the golf course, wherein at least one of the remote stations includes
        means for receiving the interrogation signal from the portable interrogation unit; and
        means responsive to receipt of the interrogation signal for encoding and communicating an interrogation information signal to a central station, wherein the interrogation information signal includes remote station identification data, data pertaining to the location of the source of the interrogation signal relative to the remote station, the portable unit identificatjion data and the request included in the received interrogation signal; and
    wherein each of the other remote stations includes
        means for receiving the interrogation signal from the portable interrogation unit; and
        means responsive to receipt of the interrogation signal for encoding and communicating an interrogation information signal to a central station wherein the interrogation information signal includes remote station identification data and information pertaining to the location of the source of the interrogation signal relative to the remote station; and
    a central station including
        means for receiving the interrogation information signals from the remote stations;
        memory means for storing golf course position information for each of said predetermined locations;
        processing means, responsive to said request, for obtaining, from said memory means, position information for said specified location and for, based upon said received interrogation information signals and said obtained position information, determining the distance between the portable interrogation unit and said specified location; and
        means responsive to said distance determination and to said received interrogation information signals for encoding and transmitting a response signal addressed to the portable interrogation unit indicated by the portable unit identification data in the received information signals, wherein the response signal indicates the requested distance; and
    wherein the portable interrogation unit further includes
        means
        means for receiving the response signal addressed to the portable interrogation unit; and
        means reponsive to the response signal for displaying an indication of the requested distance.

2. A system according to claim 1, wherein the processing means includes
    means for processing the source-location information in the interrogation information signals to provide an indication of the location of the portable interrogation unit on the golf course;
    means for accessing the memory means in response to the specified location included in the request portion of the received interrogation information signals to retrieve said golf course position information; and
    means for processing the indication of the location of the portable unit and the indication of the specified location to provide the requested distance indication for the response signal.

3. A system according to claim 2, wherein the predetermined locations include the last previous location from which an interrogation signal was transmitted from the portable interrogation unit, and wherein the processing means includes
    means for storing the last portable interrogation unit location indication in the memory means for retrieval when the request portion of the next received interrogation information signals indicates said last previous location as the specified location.

4. A system according to claim 2,
    wherein the interrogation signal further includes golfer identification data;
    wherein the interrogation information signal transmitted from at least one of the remote stations further includes data identifying a given golfer in accordance with the golfer identification data in the received interrogation signal;
    wherein the predetermined locations include the last previous location from which an interrogation signal was transmitted from the portable interrogation unit of the given golfer; and
    wherein the processing means includes
        means for storing the last portable-interrogation-unit-location indication associated with each golfer in the memory means for retrieval when the request and golfer identification data portion of the next received information signals including data identifying the given golfer indicates the said last previous location of the given golfer as the specified location.

5. A system according to claim 2, wherein the predetermined locations on the golf course include the locations of various predetermined features on the golf course, the system further comprising

- a portable survey unit for encoding and transmitting a survey signal from any feature on the golf course, wherein the survey signal includes identification of a specified predetermined feature selected from various predetermined features on the golf course; wherein at least one of the remote stations includes
- means for receiving the survey signal from the portable survey unit; and
- means responsive to receipt of the survey signal for encoding and communicating a survey information signal to a central station, wherein the survey information signal includes remote station identification data, data pertaining to the location of the source of the survey signal relative to the remote station, and the feature identification data included in the received survey signal; wherein the other remote stations each include
- means for receiving the survey signal from the portable survey unit; and
- means responsive to receipt of the survey signal for encoding and communicating a survey information signal to a central station wherein the survey information signal includes remote station identification data and information pertaining to the location of the source of the survey signal relative to the remote station; and wherein the central station includes
- means for receiving the survey information signals from the remote stations;
- means for processing the received survey information signals to determine the location on the golf course of the feature indicated by the feature identification data in the survey signal; and
- means responsive to said golf-course-feature location determination and to said received survey information signals for storing data in an area of the memory means addressed in accordance with the feature identification data portion of the received survey information signals.

6. A system according to claim 1, wherein the source-location information indicates the time of arrival of the interrogation signal.

7. A system according to claim 1, wherein the source-location information indicates the bearing of the source of the interrogation signal relative to the remote station.

* * * * *